United States Patent [19]

Smirl

[11] Patent Number: 4,630,504
[45] Date of Patent: Dec. 23, 1986

[54] DUAL-PASS CONTINUOUSLY VARIABLE TRANSMISSION

[75] Inventor: Richard L. Smirl, Arlington Hts., Ill.

[73] Assignee: Borg-Warner Corporation, Chicago, Ill.

[21] Appl. No.: 768,294

[22] Filed: Aug. 22, 1985

[51] Int. Cl.⁴ ............... F16H 11/02; F16H 37/06; F16D 41/04; F16D 47/04
[52] U.S. Cl. ........................... 74/689; 74/810; 192/48.6; 192/48.8; 192/48.9; 474/8; 474/28
[58] Field of Search .......... 74/689, 681, 810, 665 GE, 74/665 P; 474/8, 11, 28; 192/48.6, 48.8, 48.9

[56] References Cited

U.S. PATENT DOCUMENTS

| | | | |
|---|---|---|---|
| 2,711,656 | 6/1955 | Smirl | 74/864 |
| 4,205,561 | 6/1980 | Montagnino et al. | 192/48.6 X |
| 4,458,318 | 7/1984 | Smit et al. | 474/12 X |
| 4,495,837 | 1/1985 | Morscheck | 74/359 X |
| 4,495,838 | 1/1985 | Gooch | 74/359 X |
| 4,522,086 | 6/1985 | Haley | 74/867 |

FOREIGN PATENT DOCUMENTS 4412 10/1979 European Pat. Off. ............. 74/689
879350 6/1953 Fed. Rep. of Germany.

Primary Examiner—Rodney H. Bonck
Attorney, Agent, or Firm—Julian Schachner

[57] ABSTRACT

A dual-pass CVT has input and output shafts, first and second intermediate shafts, and a variator engaging the intermediate shafts. A first gear drive includes a first one-way clutch engaging the input shaft with the first intermediate shaft and allowing the first intermediate shaft to overrun. A second gear drive includes a jaw clutch for engaging the input shaft with the second intermediate shaft, and also includes a second one-way clutch engaging the second intermediate shaft with the input shaft and allowing the input shaft to overrun. A third gear drive includes another jaw clutch for engaging the first intermediate shaft with the output shaft, and also includes a third one-way clutch engaging the output shaft with the first intermediate shaft and allowing the first intermediate shaft to overrun. A fourth gear drive includes a fourth one-way clutch engaging the second intermediate shaft with the output shaft and allowing the output shaft to overrun.

7 Claims, 8 Drawing Figures

DUAL-PASS CONTINUOUSLY VARIABLE TRANSMISSION

BACKGROUND OF THE INVENTION

This invention relates generally to a continuously variable transmission (CVT) adapted for use in the driveline of an automotive vehicle. More particularly, it relates to such a CVT in which elements having fixed ratios are combined with a variator having a ratio which is continuously variable within predetermined limits. The CVT provides dual drive paths through the variator, with engine braking available at all times.

The typical automotive transmission is shifted in discrete steps between a high-torque, low-speed mode for starting a vehicle and a high-speed, low-torque mode for vehicle operation at highway speeds. In a manual transmission shifting is accomplished by the engagement of gear sets. In an automatic transmission shifting is accomplished by the controlled engagement of friction elements. Because such shifting is in step functions, the most efficient vehicle operation can only be approximated. Automotive engineers have long recognized that efficiency would be improved if the transmission could be adjusted continuously to compensate for changing loads, speeds, etc. This would allow the engine to be operated at maximum efficiency under changing conditions.

CVTs have been known for some time. The typical CVT employs a variator comprising a variable pulley with a pair of flanges mounted on a primary shaft such that one of the flanges is movable axially with respect to the other. Another, similar variable pulley is mounted on a secondary shaft. A flexible belt couples the pulleys for transferring torque therebetween when the primary shaft is driven. When the pitch radius of one pulley is changed, the pitch radius of the other pulley is changed simultaneously in the opposite direction. As a result, the drive ratio between the shafts is variable in a continuous, smooth manner within the ratio range of the variator. Typically, the limits of this range are an underdrive or reduction ratio and an overdrive ratio.

In recent years considerable work has been directed to the application of a CVT to the driveline of an automotive vehicle. In an automotive environment in particular, space constraints often dictate housing configurations, shaft center distances, pulley diameters, belt sizes, etc. Design parameters of this nature limit the ratio range and/or torque capacity of a CVT.

An important step in the development of a CVT suitable for use in an automotive vehicle is disclosed in copending U.S. application Ser. No. 564,856 filed Dec. 23, 1983. That application is assigned to the assignee of this application, and is incorporated herein by reference. Briefly, it discloses a dual-pass CVT including an input, an output, and a variator. Gear sets and one-way clutches establish a first drive path from the input through the variator in one direction to the output. Other gear sets and jaw clutches establish a second drive path from the input through the variator in the opposite direction to the output. Initially torque is transferred through the first drive path as the ratio of the variator is varied from maximum underdrive to maximum overdrive. At that point the variator ratio is equal to the corresponding gear ratios, and the system is in substantial synchronism. The jaw clutches are engaged, and the one-way clutches disengage when torque subsequently is transferred through the second drive path as the ratio of the variator is varied in the opposite direction.

When that CVT is in the high-range mode; that is, when it is configured for the second drive path, the jaw clutches are positively engaged, allowing the CVT to provide engine braking. However, when the CVT is in the low-range mode; that is, when its configuration is for the first drive path, the CVT does not provide engine braking. Rather, the one-way clutches disengage when the direction of torque transfer is from the vehicle wheels through the CVT to the engine. This may occur, for example, when the vehicle operator closes the throttle, allowing the engine to run at idle speed. In this event the typical transmission control system would upshift the transmission in the interest of economy. For a dual-pass CVT, the typical control system would configure it for the second drive path. The process of so configuring a dual-pass CVT could take several seconds, during which time no engine braking would be available. Thus there is a need in the art for a dual-pass CVT which provides engine braking during this transition period, so that engine braking is available at all times.

SUMMARY OF THE INVENTION

This invention is directed to meeting this need. To that end, there is disclosed herein a dual-pass CVT having input and output shafts, first and second intermediate shafts, and a variator engaging the intermediate shafts. First drive means includes a first one-way clutch engaging the input shaft with the first intermediate shaft and allowing the first intermediate shaft to overrun. Second drive means includes clutching means for engaging the input shaft with the second intermediate shaft, and also includes a second one-way clutch engaging the second intermediate shaft with the input shaft and allowing the input shaft to overrun. Third drive means includes other clutching means for engaging the first intermediate shaft with the output shaft, and also includes a third one-way clutch engaging the output shaft with the first intermediate shaft and allowing the first intermediate shaft to overrun. Fourth drive means includes a fourth one-way clutch engaging the second intermediate shaft with the output shaft and allowing the output shaft to overrun.

BRIEF DESCRIPTION OF THE DRAWINGS

The objects and advantages of this invention will become apparent to those skilled in the art upon careful consideration of the specification herein, including the drawings, wherein.

Figure 1A:
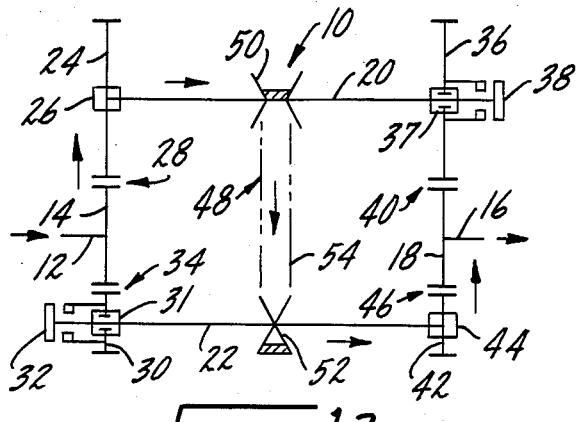
FIGS. 1a, b, c, d, e and f are schematic illustrations of the operating sequence of the dual-pass CVT of this invention.

While this invention is susceptible of embodiment in many different forms, the preferred embodiment is shown in the drawings and described in detail. It should be understood that the present disclosure is considered to be an exemplification of the principles of the invention, and is not intended to limit the invention to this embodiment.

DESCRIPTION OF THE PREFERRED EMBODIMENT

Figure 2:
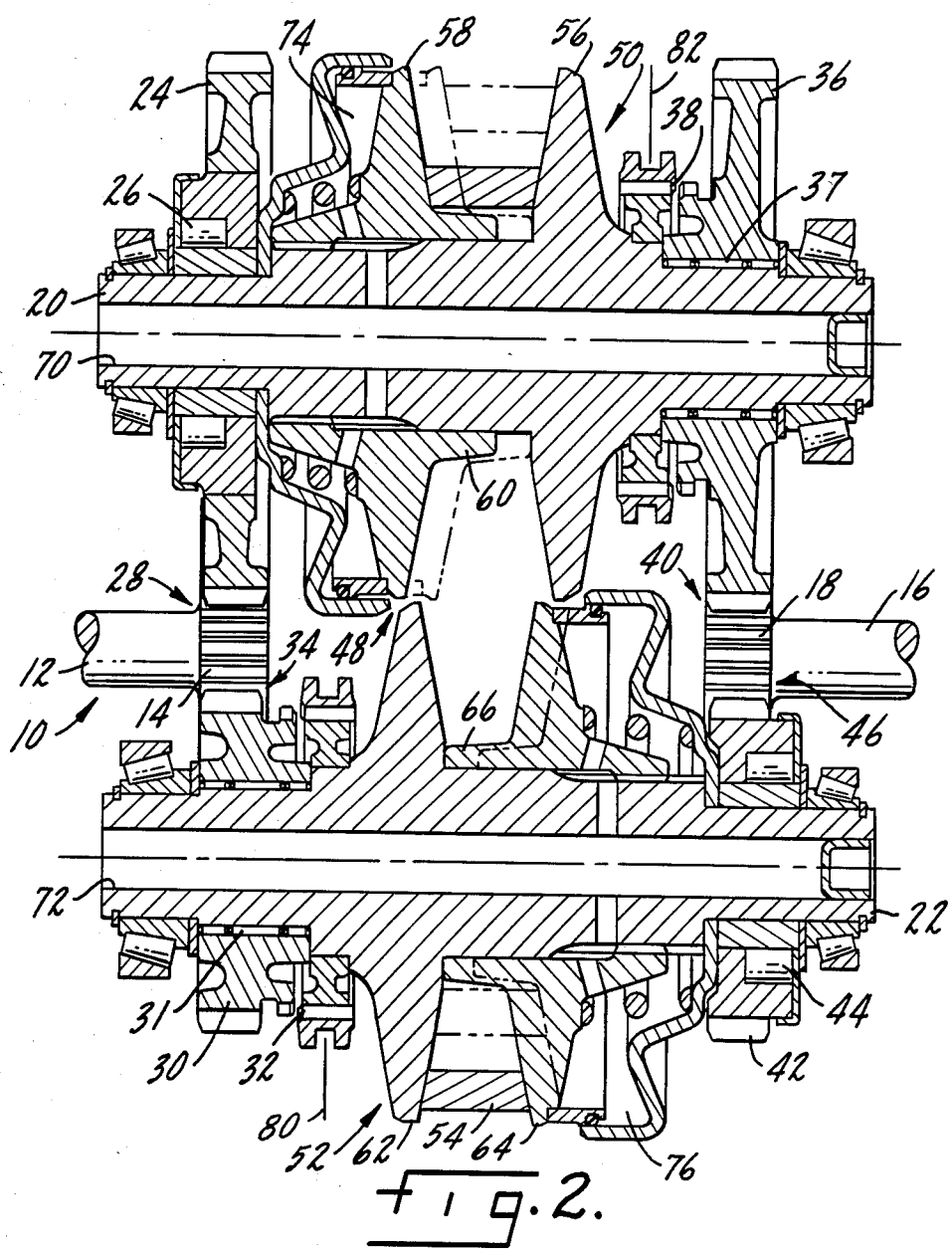
FIG. 2 is a sectional view showing details of the dual-pass CVT of this invention.
Figure 3:
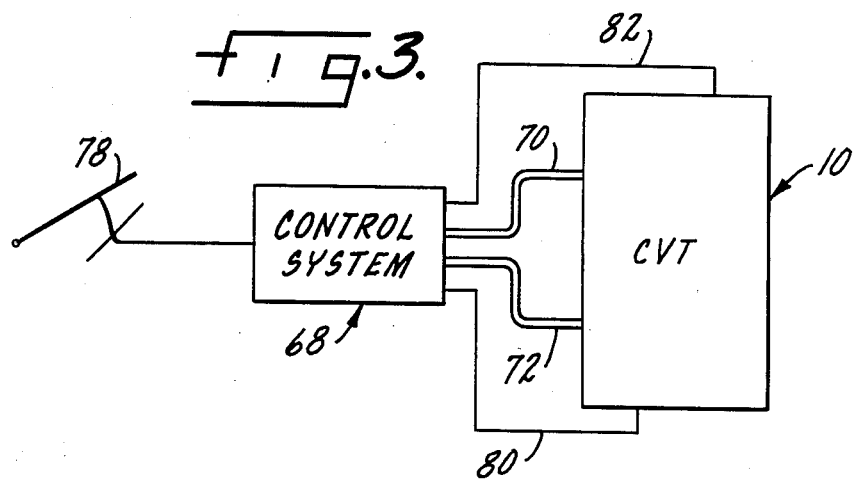
FIG. 3 is a diagram illustrating a control system for the dual-pass CVT of this invention.

Referring now to FIGS. 1a, b, c and d and FIG. 2 in greater detail, the preferred embodiment of this invention incorporates a dual-pass CVT 10 including an input shaft 12 adapted to receive torque from a power source, for example the engine of an automobile vehicle. An input drive gear 14 is secured to shaft 12. CVT 10 also includes an output shaft 16 adapted to direct torque to a load, for example the drive axle of an automotive vehicle. An output driven gear 18 is secured to shaft 16. Gear 14 should be designed to mate CVT 10 to the particular engine with which it is to be used, and gear 18 should be designed to mate CVT 10 to the vehicle driveline. Design considerations will determine the number of teeth which these two gears have.

CVT 10 also includes first and second intermediate shafts 20 and 22 respectively.

A first driven gear 24 is secured to the outer race of a first one-way clutch 26, the inner race of which is secured to shaft 20. One-way clutch 26 is oriented such that shaft 20 may overrun gear 24. Gear 14, gear 24 and one-way clutch 26 together constitute first drive means 28 for transferring torque from shaft 12 to shaft 20, but not from shaft 20 to shaft 12.

A second driven gear 30 is secured to the outer race of a second one-way clutch 31, the inner race of which is secured to shaft 22. One-way clutch 31 is oriented such that gear 30 may overrun shaft 22. In parallel with clutch 31, clutching means 32 in the form of a jaw clutch or the like may be engaged to lock gear 30 to shaft 22. Gear 14, gear 30, clutching means 32 and one-way clutch 31 together constitute second drive means 34 for transferring torque in either direction between shafts 12 and 22 when clutching means 32 is engaged, and from shaft 22 to shaft 12 when clutching means 32 is not engaged.

A third drive gear 36 is secured to the outer race of a third one-way clutch 37, the inner race of which is secured to shaft 20. One-way clutch 37 is oriented such that shaft 20 may overrun gear 36. In parallel with clutch 37, other clutching means 38 in the form of another jaw clutch or the like may be engaged to lock shaft 20 to gear 36. Other clutching means 38, gear 36, gear 18 and one-way clutch 37 together constitute third drive means 40 for transferring torque in either direction between shafts 20 and 16 when other clutching means 38 is engaged, and from shaft 16 to shaft 20 when other clutching means 38 is not engaged.

A fourth drive gear 42 is secured to the outer race of a fourth one-way clutch 44, the inner race of which is secured to shaft 22. One-way clutch 44 is oriented such that gear 42 may overrun shaft 22. One-way clutch 44, gear 42 and gear 18 together constitute fourth drive means 46 for transferring torque from shaft 22 to shaft 16, but not from shaft 16 to shaft 22.

The particular application of CVT 10 will determine whether these four drive means provide underdrive or overdrive. For example, if CVT 10 is to be used in a passenger automobile with a gasoline engine, it may be assumed that drive means 28 and 46 provide underdrive, and that drive means 34 and 40 provide overdrive. With this assumption, gear set 24–14 has an underdrive ratio, and gear set 30–14 has an overdrive ratio. Thus the ratio through a gear train comprising gears 24, 14 and 30 (from shaft 20 to shaft 22) is overdrive. In the opposite direction the ratio is underdrive. Similarly, gear set 18–36 has an overdrive ratio, and gear set 18–42 has an underdrive ratio. Thus the ratio through a gear train comprising gears 36, 18 and 42 (from shaft 20 to shaft 22) is overdrive. In the opposite direction the ratio is underdrive. It is important to remember, however, that this relationship may be modified so long as the ratios through the gear trains (from one intermediate shaft to the other) are equal.

Based upon the assumptions noted above, the ratios from shaft 20 to shaft 22 will be overdrive, and the ratios from shaft 22 to shaft 20 will be underdrive. Gear sets preferably provide these ratios, as it is believed that gearing allows maximum design flexibility with a particular advantage being that gear 14 is a common drive gear. Given this advantage, simply by changing the number of teeth in gear 14, the designer easily could provide gear sets with other ratio relationships if CVT 10 were to be used, for example, in an agricultural tractor with a Diesel engine, or in a sports car with a high-speed engine.

A variator 48 engages shafts 20 and 22. Variator 48 includes a variable pulley 50 on shaft 20 and another variable pulley 52 on shaft 22. Pulleys 50 and 52 are continuously variable respectively between minimum and maximum pitch radii. A suitable belt 54 or the like couples pulleys 50 and 52.

As is well known in the art, the pitch radii of pulleys 50 and 52 may be varied such that the ratio of variator 48 is continuously variable within a range having predetermined limits. These limits should provide a fifth, underdrive ratio and a sixth, overdrive ratio substantially equal to the overdrive ratio through gear trains 24,14,30 and 36,18,42.

With particular reference to FIG. 2, pulley 50 includes a fixed flange 56 rotatable with shaft 20 and a slidable flange 58 having a hub 60 rotatable with and slidable relative to shaft 20. As shown in solid lines, flange 58 is in its distal position relative to flange 56. In this position pulley 50 develops its minimum pitch radius. As shown in dashed lines, flange 58 is in its proximal position, with hub 60 abutting flange 56. In this position pulley 50 develops its maximum pitch radius.

Pulley 52 is similar to pulley 50, and includes a fixed flange 62 rotatable with shaft 22 and a slidable flange 64 having a hub 66 rotatable with and slidable relative to shaft 22. As shown in solid lines, flange 64 is in its proximal position relative to flange 62, with hub 66 abutting flange 62. This determines the maximum pitch radius of pulley 52. As shown in dashed lines, flange 64 is in its distal position, which determines the minimum pitch radius of pulley 52.

A suitable control system 68 is provided for directing fluid through passages 70 and 72 to and from chambers 74 and 76 respectively in order to slide flanges 58 and 64, and thus to vary the pitch radii of pulleys 50 and 52 between their predetermined minimum and maximum limits. The particular details of control system 68 form no part of this invention. Typical control systems for conventional CVTs are disclosed in U.S. Pat. No. 4,458,318 issued July 3, 1984 and U.S. Pat. No. 4,522,086 issued June 11, 1985. Those patents are assigned to the assignee of this application, and are incorporated herein by reference. Suffice to say that one factor influencing control system 68 is the position of a throttle 78.

The sequence of events for an upshift begins after an associated starting clutch (not shown but preferably on the output side of CVT 10) is engaged. A first drive path is established from shaft 12 through drive means 28, shaft 20, variator 48, shaft 22 and drive means 46 to shaft 16. (See the arrows in FIG. 1a.) Gear 30 is rotating faster than shaft 22, with clutches 31 and 32 disengaged. Similarly, gear 36 is rotating slower than shaft 20, with clutches 37 and 38 disengaged. At this point CVT 10 is in the low-range mode, and provides underdrive from shaft 12 to shaft 16.

Figure 1B:
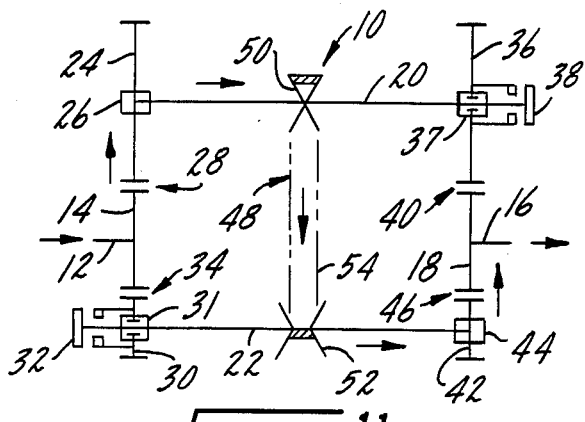

Variator 48 now is shifted continuously through its ratio range from underdrive (FIG. 1a) to overdrive (FIG. 1b). This results in a continuous, smooth increase in the output speed at shaft 16.

At the end of the first pass through variator 48, CVT 10 provides direct drive from shaft 12 to shaft 16. Shaft 22 is in substantial synchronism with gear 30, and shaft 20 is in substantial synchronism with gear 36. If desired, suitable sensors may be provided for transmitting appropriate torque and/or speed signals. In response to these signals, if provided, control system 68 engages clutches 32 and 38 by means of some shift mechanism 80,82. However clutches 32 and 38 are engaged, it should be noted that no synchronizers are required.

When clutches 32 and 38 are engaged, a second drive path is established from shaft 12 through drive means 34, shaft 22, variator 38, shaft 20 and drive means 40 to shaft 16. (See the arrows in FIG. 1c.) CVT 10 is in the high-range mode, but still provides direct drive from shaft 12 to shaft 16.

CVT is conditioned such that when variator 48 is shifted in the opposite direction, one-way clutches 26 and 44 disengage automatically, allowing shaft 20 to overrun gear 24, and allowing gear 42 to overrun shaft 22. Thus a smooth changeover from the first drive path to the second drive path is achieved simply and easily.

Figure 1C:
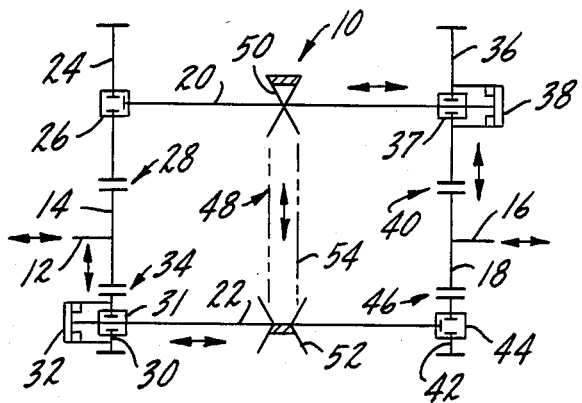
Figure 1D:
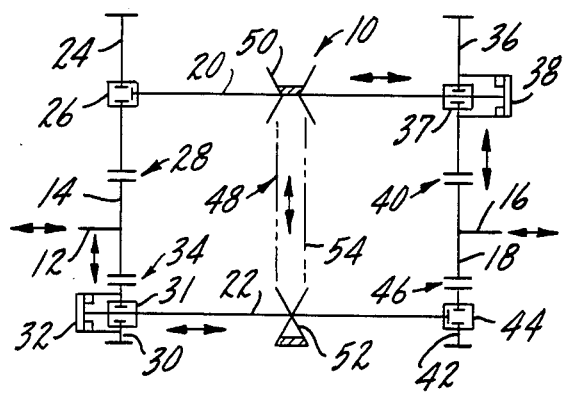

Variator 48 now is shifted in the opposite direction continuously through its ratio range from underdrive (FIG. 1c) to overdrive (FIG. 1d). This results in an additional continuous, smooth increase in the output speed at shaft 16.

At the end of the second pass through variator 48, CVT 10 provides overdrive from shaft 12 to shaft 16. One operating cycle (two passes through variator 48) has been completed. Belt 54 is in its initial, starting position, with pulleys 50 and 52 rotating at correspondingly higher speeds.

It will be noted that jaw clutches 32 and 38 are engaged when CVT 10 is in the high-range mode; that is, when it is configured for the second drive path (FIGS. 1c and d). Clutches 32 and 38 establish a positive connection for the transfer of torque between shafts 12 and 16. Thus CVT 10 provides engine braking in this mode.

If the vehicle operator closes throttle 78 when CVT 10 is in the low-range mode; that is, when it is configured for the first drive path (FIGS. 1a and b), one-way clutches 26 and 42 disengage immediately upon the transfer of torque from shaft 16 to shaft 12. Thus no engine braking would normally be provided when CVT 10 is in this mode. However, as one-way clutches 26 and 44 disengage, one-way clutches 31 and 37 engage to establish the second drive path (FIG. 1e) for the transfer of torque from shaft 16 to shaft 12. CVT 10 provides engine braking through the second drive path at whatever ratio may be determined by variator 48.

Figure 1E:
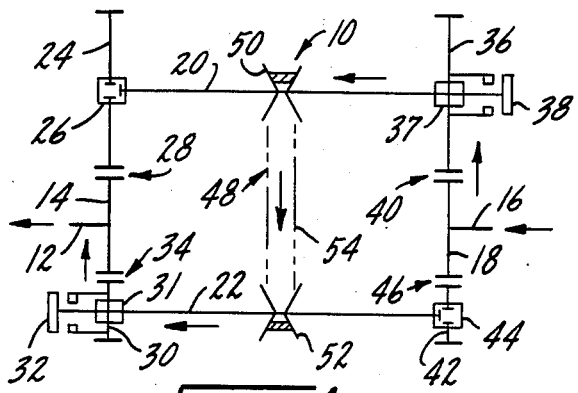
Figure 1F:
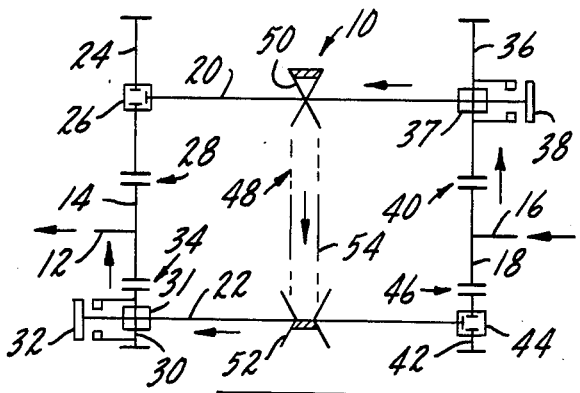

At this point the typical control system upshifts variator 48 to configure CVT 10 for maximum fuel economy (FIG. 1f). A discussion of this feature as incorporated in a conventional transmission control system is found in U.S. Pat. No. 2,711,656 issued June 28, 1955. That patent is assigned to the assignee of this application, and is incorporated herein by reference. Jaw clutches 32 and 38 then are engaged to again establish a positive connection for the transfer of torque between shafts 12 and 16 (FIG. 1c) until the vehicle speed decreases to a predetermined level. Thereafter jaw clutches 32 and 38 are disengaged and engine braking again is provided through one-way clutches 31 and 37 (FIGS. 1e and f). This assures the continuation of engine braking until the vehicle operator again opens throttle 78, at which time one-way clutches 31 and 37 disengage. The throttle position and driving conditions then determine the configuration of CVT 10.

If the operator closes throttle 78 when CVT 10 is in the high-range mode; that is, when it is configured for the second drive path (FIGS. 1c and d), engine braking is provided through jaw clutches 32 and 38 until the vehicle speed decreases to a predetermined level. Thereafter it is provided through one-way clutches 31 and 37. When the operator again, opens throttle 78, its position and the driving conditions determine the configuration of CVT 10.

A relatively low torque is transferred through the CVT when engine braking is provided. Thus one-way clutches 31 and 37 may be relatively small as compared with one-way clutches 26 and 42. Indeed, they may be interchangeable with the bearings which would otherwise be used to support gears 30 and 36. This simplifies the assembly of the CVT, and allows the manufacturer to economically supply either type, as desired by the customer.

It should be understood that while the preferred embodiment of the invention has been shown and described, this is to be considered as illustrative and may be modified by those skilled in the art. It is intended that the claims herein cover all such modifications as may fall within the spirit and scope of the invention.

What is claimed is:

1. A dual-pass continuously variable transmission comprising rotatable input and output shafts, first and second rotatable intermediate shafts, first drive means including a first one-way clutch engaging said input shaft with said first intermediate shaft and allowing said first intermediate shaft to overrun, second drive means including clutching means for engaging said input shaft with said second intermediate shaft, said second drive means also including a second one-way clutch engaging said second intermediate shaft with said input shaft and allowing said input shaft to overrun, third drive means including other clutching means for engaging said first intermediate shaft with said output shaft, said third drive means also including a third one-way clutch engaging said output shaft with said first intermediate shaft and allowing said first intermediate shaft to overrun, fourth drive means including a fourth one-way clutch engaging said second intermediate shaft with said output shaft and allowing said output shaft to overrun, and a variator engaging said intermediate shafts, said first and fourth drive means establishing a first drive path from said input shaft through said first drive means, first intermediate shaft, variator, second intermediate shaft and fourth drive means to said output shaft, said second and third drive means, when said clutching means and other clutching means are engaged, establishing a second drive path from said input shaft through said second drive means, second intermediate shaft, variator, first intermediate shaft and third drive means to said output shaft, and said second and third drive means, when said clutching means and other clutching means are not engaged, establishing said second drive path from said output shaft through said third drive means, first intermediate shaft, variator, second intermediate shaft and second drive means to said input shaft.

2. The dual-pass continuously variable transmission of claim 1, said first and second drive means respectively including first and second gear sets driven by said input shaft.

3. The dual-pass continuously variable transmission of claim 1, said third and fourth drive means respectively including third and fourth gear sets driving said output shaft.

4. The dual-pass continuously variable transmission of claim 2, said third and fourth drive means respectively including third and fourth gear sets driving said output shaft.

5. The dual-pass continuously variable transmission of claim 4, said first one-way clutch engaging the driven gear of said first gear set with said first intermediate shaft, said clutching means including a jaw clutch for engaging the driven gear of said second gear set with said second intermediate shaft, said second one-way clutch engaging said second intermediate shaft with the driven gear of said second gear set, said other clutching means including another jaw clutch for engaging said first intermediate shaft with the drive gear of said third gear set, said third one-way clutch engaging the drive gear of said third gear set with said first intermediate shaft, and said fourth one-way clutch engaging said second intermediate shaft with the drive gear of said fourth gear set.

6. The dual-pass continuously variable transmission of claim 5, said variator including a variable pulley rotatable with said first intermediate shaft, another variable pulley rotatable with said second intermediate shaft, and a belt coupling said pulleys, each of said pulleys including a fixed flange rotatable with its associated intermediate shaft, and another flange rotatable with and slidable relative to its associated intermediate shaft between proximal and distal positions relative to its associated fixed flange, the distal position of the slidable flange of said pulley and the proximal position of the slidable flange of said other pulley determining one of said limits, and the proximal position of the slidable flange of said pulley and the distal position of the slidable flange of said other pulley determining the other of said limits.

7. A multi-pass continuously variable transmission comprising rotatable input and output shafts; first and second rotatable intermediate shafts; a variator; drive means having one-way clutch means engageable for completing a first drive path extending in one direction from said input shaft through said first intermediate shaft, variator, and second intermediate shaft to said output shaft; and other drive means having clutching means engageable for completing a second drive path extending in one direction from said input shaft through said second intermediate shaft, variator, and first intermediate shaft to said output shaft; said second drive path also extending in the opposite direction from said output shaft through said first intermediate shaft, variator, and second intermediate shaft to said input shaft; said other drive means also having other one-way clutch means engageable for completing said second drive path extending in said opposite direction; said other one-way clutch means being engageable upon disengagement of said one-way clutch means when said clutching means is disengaged.

* * * * *